United States Patent [19]

Lesh, Jr.

[11] 3,840,057

[45] Oct. 8, 1974

[54] INFLATION SYSTEM

[75] Inventor: Harvey B. Lesh, Jr., North Canton, Ohio

[73] Assignee: The B. F. Goodrich Company, New York, N.Y.

[22] Filed: Dec. 20, 1972

[21] Appl. No.: 316,827

[52] U.S. Cl............. 141/67, 9/2 A, 141/100, 141/114, 182/48, 193/25 B, 244/137 P
[51] Int. Cl............. B65c 11/10, A62b 1/20
[58] Field of Search ........... 141/67, 100, 114, 392; 417/55; 182/48; 193/25 B; 244/137 P; 9/2 A

[56] References Cited
UNITED STATES PATENTS

| 2,399,670 | 5/1946 | Freygang | 9/2 A |
| 2,761,617 | 9/1956 | Van Ornum et al. | 417/355 |
| 2,765,131 | 10/1956 | Boyle | 244/137 P |
| 3,216,654 | 11/1965 | Kappus | 417/355 |

Primary Examiner—Harry N. Haroian
Assistant Examiner—Steven L. Stephan
Attorney, Agent, or Firm—John D. Haney

[57] ABSTRACT

An inflation system for an inflatable container having a conduit with an inner and outer passage. A turbine fan is mounted in the inner passage and has impeller blades extending into the outer passage. High pressure gas is directed through the outer passage against the impeller blades and into the container for rotating the fan to pump ambient air through the conduit into the container.

4 Claims, 4 Drawing Figures

INFLATION SYSTEM

BACKGROUND OF THE INVENTION

This invention relates to an inflation system and particularly to a system for rapid inflation of large expandable containers such as escape slides for aircraft. Inflation systems of this type are required to inflate large inflatables having a volume of over 100 cubic feet in a matter of seconds. For example an escape slide for one aircraft has a volume of over 400 cubic feet and must be deployed and inflated in less than 7 seconds.

In order to inflate the large inflatables of this type it is necessary to use ambient air as well as gas from a high pressure source. Heretofore aspirator-type inflation systems of the required compact size have been used in which an explosive charge provides high pressure gas which is propelled through a venturi into the inflatable container. The venturi is connected to a source of ambient air for pumping air into the inflatable container as the high pressure gas passes through the venturi. Using this apparatus for rapid inflation has provided inflation of the container by a mixture containing approximately sixty-six percent ambient air and 33 percent gas made up of combustion products. The gas generator has been of a size which must be mounted on the aircraft and has been connected to the escape slide by inflating hoses. At least two aspirators connected to the generator have been required for a large escape slide.

Aircraft escape slides must be tested at periodic intervals and it has been found that they are also inadvertently deployed during the maintenance of the aircraft. Each time the escape slide is deployed with the above described aspirator-type inflation system the slide must be disassembled and the parts cleaned because of the combustion products injected into the slide from the gas generators. If this is not done the parts will corrode and there is danger of malfunction of the escape slide. Such a risk cannot be taken with emergency equipment of this type and therefore this costly time-consuming disassembly and cleaning must be done every time escape slide is deployed. High pressure aspirator systems using clean gas from containers have not been satisfactory because they require excessive space to store the containers.

SUMMARY OF THE INVENTION

According to this invention rapid inflation of a large volume inflatable container such as an aircraft escape slide is provided by a relatively compact apparatus without injecting corrosive combustion products into the inflatable container. It has been found that a relatively small lightweight high speed turbine fan driven by a high pressure inert gas which will not contaminate the inflatable container will pump ambient air into the container and provide an inflation mixture containing 80 percent ambient air and 20 percent inflating gas. The inert gas is clean as is the ambient air and therefore it is not necessary to clean the container and parts after every deployment of the escape slide. The high pressure gas container and the turbine fan have a relatively compact size and can be mounted on the escape slide eliminating the need for inflation hoses running from the aircraft to the escape slide or a large space for the gas containers.

The accompanying drawings show one preferred form made in accordance with and embodying this invention and which is representative of how this invention may be practiced.

DETAILED DESCRIPTION

Figure 1:
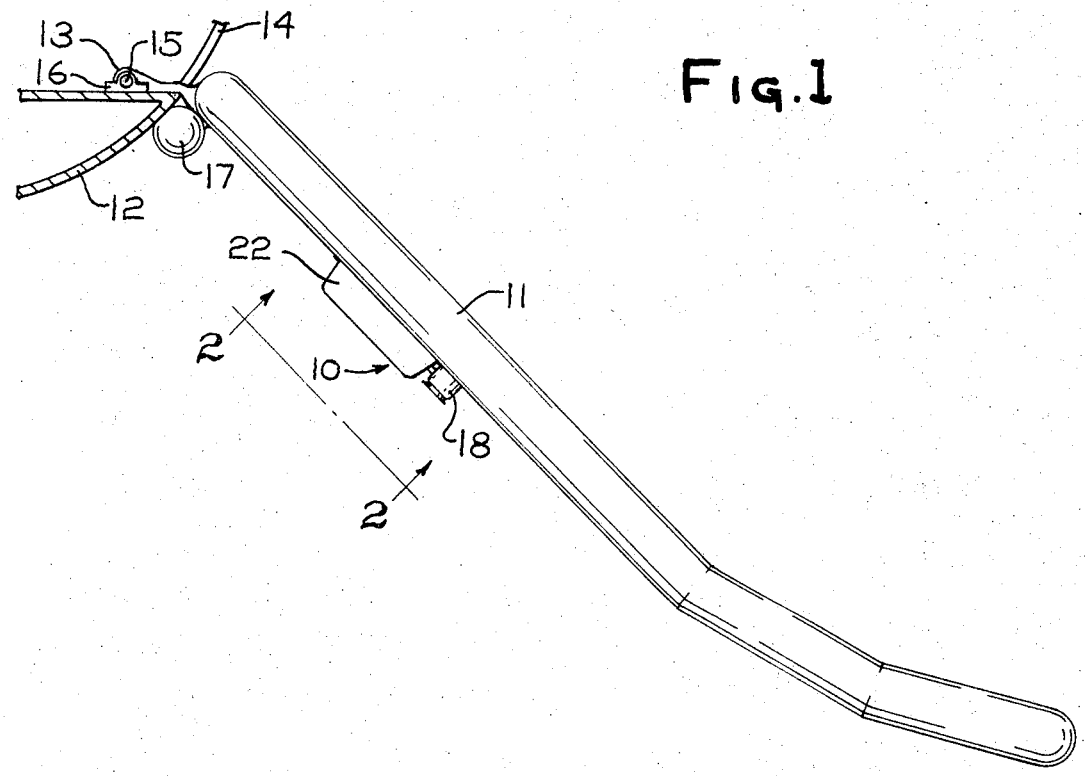
FIG. 1 is a side elevation of an aircraft escape slide on which an inflation system embodying the invention is mounted showing the slide in the deployed inflated condition mounted on an aircraft with parts of the aircraft being sectioned and broken away.

Referring to FIG. 1 an inflation system 10 embodying the invention is shown mounted on an inflatable container such as aircraft escape slide 11 shown in the inflated condition extending from a supporting structure such as an aircraft fuselage 12 to the ground so that passengers may slide down the slide safely from the aircraft to the ground. The escape slide 11 is fastened to the fuselage 12 at an upper end 13 in a doorway 14 by a rod 15 extending through the upper end and mounted on the fuselage in brackets 16 or by other suitable means fastened to the fuselage. A positioning tube 17 which is connected to the escape slide 11 may be located between the slide and fuselage 12 to aid in positive positioning of the slide during deployment.

Figure 2:
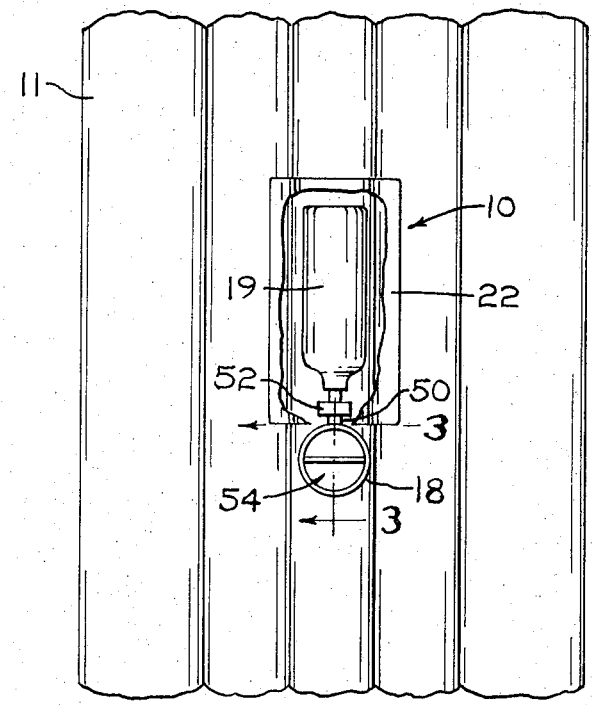
FIG. 2 is a view of the underside of the slide taken along the plane of line 2—2 of FIG. 1 with parts being broken away to show the high pressure gas container.

In FIGS. 1 and 2 the inflation system 10 includes a cylindrical conduit such as tube 18 mounted on the underside of the escape slide 11 and connected to a source of high pressure fluid such as bottle 19 which is held in a hanger 22 fastened to the underside of the escape slide and having fasteners (not shown) for opening the hanger to replace the bottle.

Figure 3:
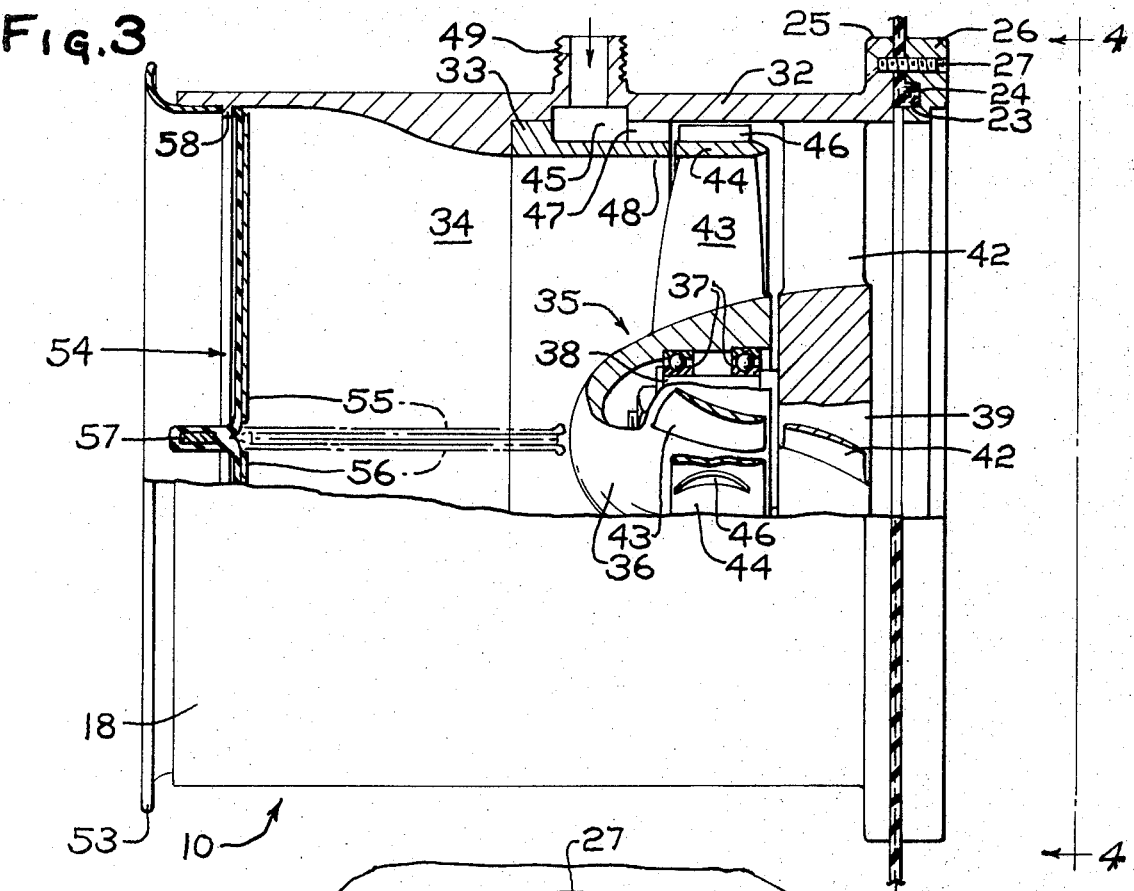
FIG. 3 is an enlarged sectional view of the inflation system taken along the planes of line 3—3 of FIG. 2 with parts being broken away.
Figure 4:
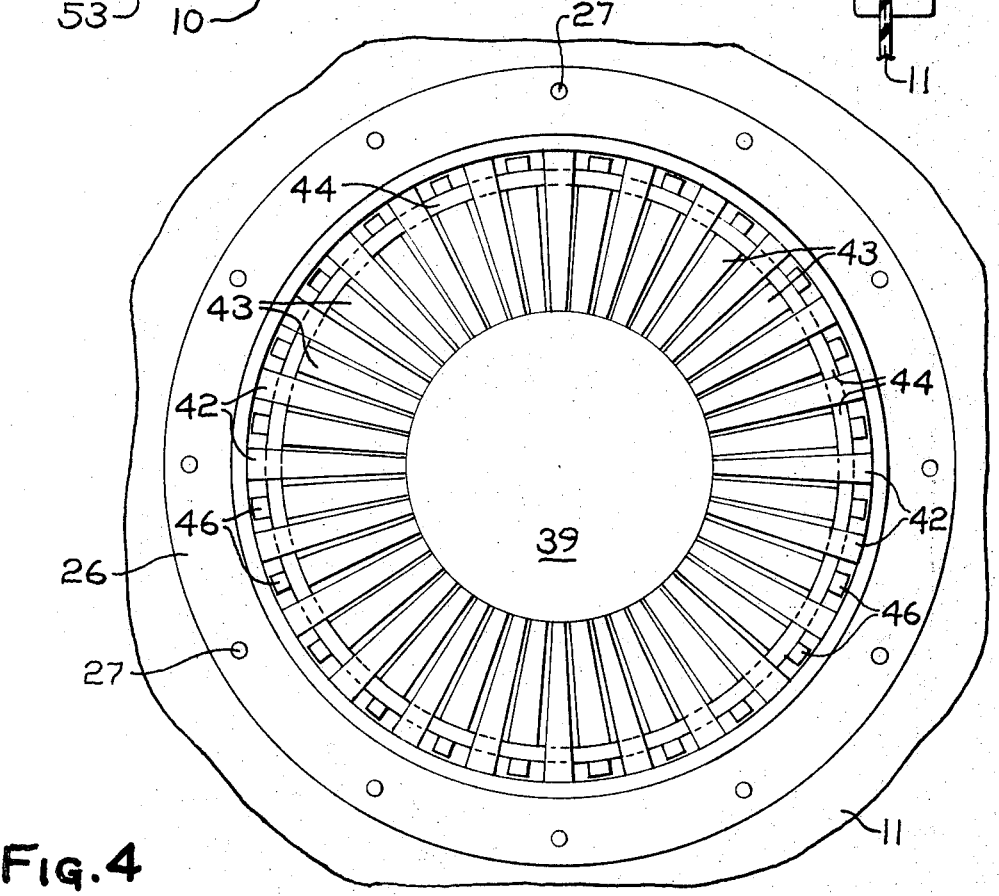
FIG. 4 is a fragmentary view taken along the plane of line 4—4 of FIG. 3 showing the inflation system from the inside of the escape slide.

Referring to FIG. 3 the tube 18 which may be of aluminum is mounted in an opening 23 in the escape slide 11 with a beaded edge 24 of the escape slide being clamped between a flange 25 of the tube and a circular ring 26 by screws 27 at circumferentially spaced-apart positions around the end of the tube.

An outer wall 32 of the tube 18 is concentric and extends around an inner tubular member such as cylinder 33 surrounding an inner passage 34 of the tube 18.

A turbine fan 35 having a hub 36 rotatably mounted on bearings 37 supported by shaft 38 of a stator 39 is mounted in the inner passage 34. A stator 39 has stator vanes 42 extending to the outer wall 32 for supporting the stator and for directing the inflating fluid into the escape slide 11.

The turbine fan 35 has fan blades 43 extending from the hub 36 to an impeller ring 44 in spaced-apart relationship with the outer wall 32 to provide with the cylinder 33 an outer passage 45 in the tube 18. Impeller blades 46 are mounted on the outer surface of the impeller ring 44 for receiving gas directed through orifices 47 in a nozzle ring 48 between the outer wall 32 and cylinder 33. A nipple 49 on the outer wall 32 is provided for passage of the high pressure fluid into the outer passage 45 and is threaded for connection through a flexible hose 50 to a pressure reducer 52 shown in FIG. 2 disposed between the tube 18 and the bottle 19. Preferably the bottle 19 contains nitrogen or other suitable inert gas at a pressure of approximately three thousand pounds per square inch and the pressure reducer 52 provides gas at a pressure of from one hundred fifty to four hundred pounds per square inch for entrance into the outer passage 45 through the orifices 47 and against the impeller blades 46 causing the turbine fan 35 to rotate and the fan blades 43 to pump ambient air through the inner passage 34 into the escape slide 11.

As shown in FIG. 3 the opening at the left end of the tube 18 has a flange 53 extending into the atmosphere and a source of ambient air. A one-way valve 54 is provided for closing the tube when the inflation system is not in operation and also when the escape slide 11 is fully inflated. The valve 54 has a pair of semi-circular flaps 55 and 56 which are resiliently mounted on a radially extending beam 57 extending across the mouth of the tube 18 to urge the flaps into the position shown in full lines in FIG. 3 abutting a flange 58 projecting radially inward from the wall of the tube 18. When the turbine fan 35 is in operation and the escape slide 11 is not inflated the flaps 55 and 56 will be urged into the position shown in dot-dash lines in FIG. 3 to permit the ambient air to be pumped through the inner passage 34 of the tube 18. In the embodiment shown the turbine fan 35 is rotated by the high pressure gas from bottle 19 at a speed of from 20,000 to 40,000 revolutions per minute and the ambient air is pumped into the escape slide 11 along with the gas from the bottle 19 to inflate the escape slide in a matter of seconds with the proportion of ambient air to inflation gas being approximately four to one. After the escape slide 11 has been inflated to a pressure of approximately 3 pounds per square inch the rotation of the turbine fan 35 will no longer pump ambient air into the slide and the one-way valve 54 will close. The high pressure gas directed through the outer passage 45 will provide enough pressure to compensate for the stretching of the walls of the escape slide 11.

In the embodiment shown the one-way valve 54 is located upstream from the turbine fan 35 and the nipple 49 however in some applications it may be desirable to locate the one-way valve downstream of the turbine fan. In such an installation a grid or screen may be installed upstream of the fan 35 to prevent fabric ingestion.

In operation the inflation system 10 is folded in with the escape slide 11 in the deflated condition and stored in the aircraft. Upon release of the escape slide 11 from the aircraft it unfolds and exposes the tube 18 whereupon the bottle 19 is opened releasing nitrogen at approximately 3,000 pounds per square inch to the pressure reducer 52 which propels the nitrogen at approximately 300 pounds per square inch through the outer passage 45 of the tube 18. The movement of the high pressure gas through the orifices 47 against the impeller blades 46 turns the turbine fan 35 at a high rate of speed from 20,000 to 40,000 rpm's providing a negative pressure in the tube 18 and opening the one-way valve 54. The high pressure gas is directed past the stator 39 into the escape slide 11 while ambient air is pumped through the inner passage 34 by the fan blades 43 through the stator vanes 42 into the escape slide 11 until inflation to approximately 3 pounds per square inch takes place. The resilient connection of the flaps 55 and 56 to the beam 57 then overcomes the pressure in the tube 18 and the flaps are returned to the position shown in solid lines in FIG. 3 for retaining the inflating air and gas in the escape slide 11. The pressure in the slide 11 also tends to hold the flaps 55 and 56 in the closed position.

With this construction a clean gas and air mixture inflates the escape slide 11 and obviates the necessity of cleaning the equipment after every deployment of the slide. Also the inflation system is compact and light without requiring heavy large gas containers.

It is understood that the inflation system embodying the present invention may also be used in other applications such as for inflating life rafts and the invention is not confined to the embodiment described and shown in this application.

I claim:

1. An inflation system comprising in combination an inflatable foldable container, an opening in said container, a conduit fastened to said opening and mounted on said foldable container, a bottle member for high pressure inflating fluid mounted on said foldable container, said conduit having an outer wall, an inner tubular member mounted within said outer wall and extending to a source of inflating fluid, an inner passage in said tubular member and an outer passage between said tubular member and said outer wall, a turbine fan mounted in said inner passage and having fan blades extending radially from a central hub to a surrounding ring located adjacent the wall of said tubular member, impeller blades mounted on said ring and extending into said outer passage, said bottle member being connected to said outer passage for propelling high pressure fluid through said outer passage against said impeller blades to rotate said turbine fan whereby said fan blades pump inflating fluid from said source to said inflatable container as said high pressure fluid is propelled from said bottle member through said outer passage into said inflatable container and a nonrotatable one way valve mounted in said conduit between said source of inflation fluid and said turbine fan for preventing flow of said high pressure fluid out of said inflatable container.

2. An inflation system according to claim 1 wherein a nozzle ring is mounted in said outer passage between said fluid pressure means and said impeller blades, said nozzle ring having generally axially extending passages for directing the high pressure fluid against said impeller blades whereby said turbine fan is rotated at a high speed for pumping said inflating fluid into said inflatable container.

3. An inflation system according to claim 1 wherein pressure reducing means are located between said high pressure means and said turbine fan for controlling the speed at which the fan is rotated and the duration of the rotation for propelling the maximum amount of inflating fluid and the minimum amount of high pressure fluid into said inflatable container in the minimum amount of time permitted for full inflation of said inflatable container.

4. An inflation system according to claim 3 wherein said high pressure fluid is ejected from said pressure reducing means at from 150 to 400 pounds per square inch pressure and said turbine fan is rotated at speeds of from 20,000 to 40,000 revolutions per minute.

* * * * *